Jan. 9, 1951     W. L. GIBLET     2,537,048
COLOR WHEEL FOR SPRINKLERS
Filed March 8, 1946     2 Sheets-Sheet 1
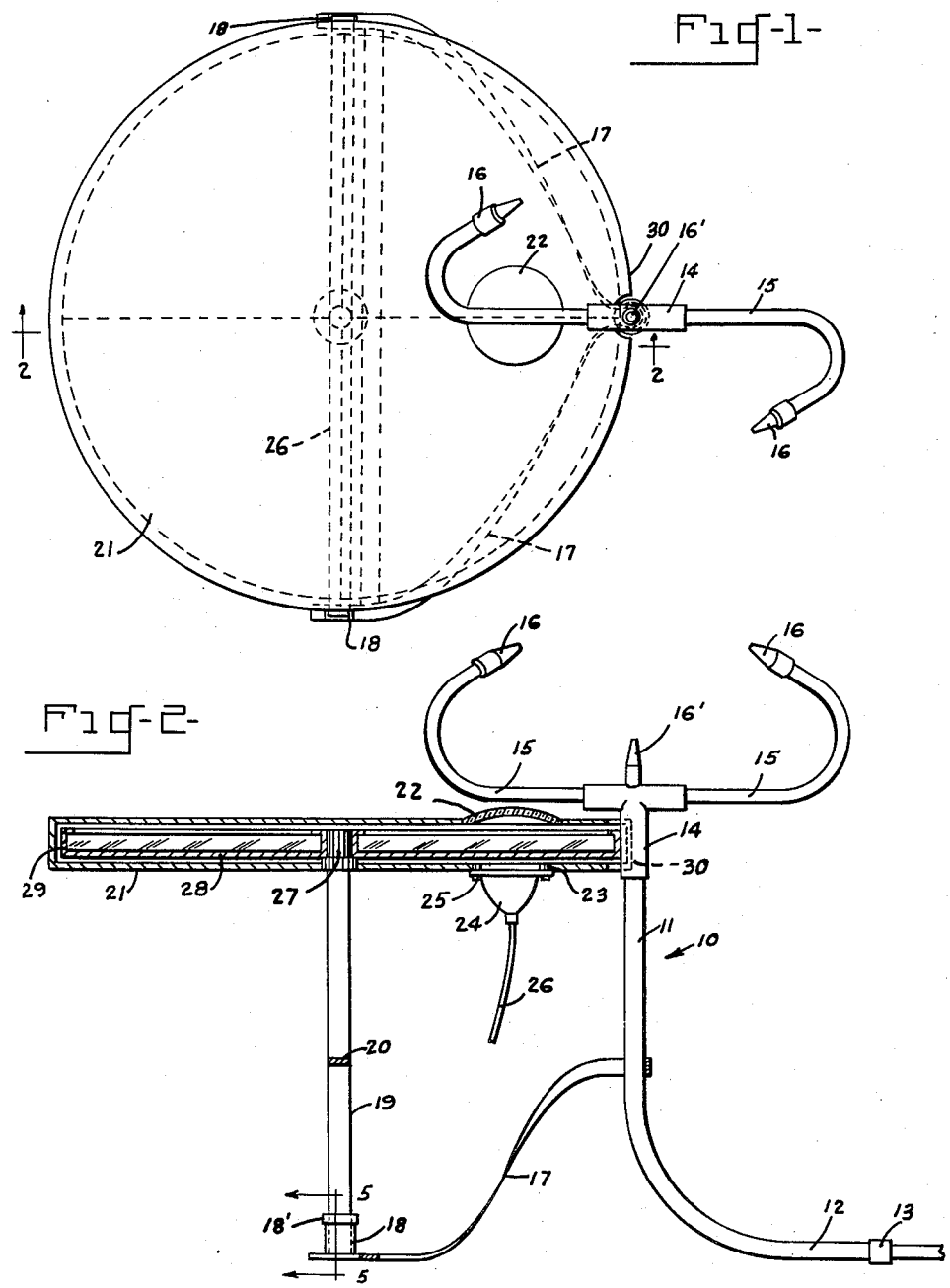
INVENTOR.
Walter Lee Giblet Jan. 9, 1951             W. L. GIBLET             2,537,048
COLOR WHEEL FOR SPRINKLERS
Filed March 8, 1946                            2 Sheets-Sheet 2
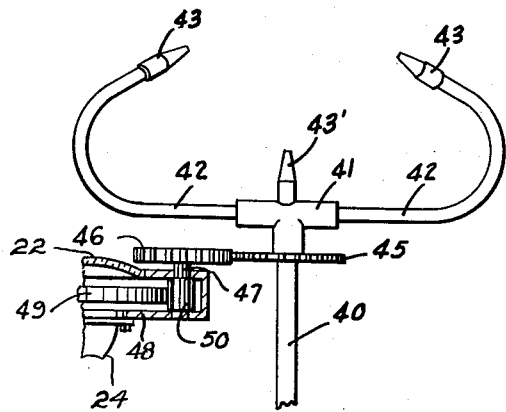
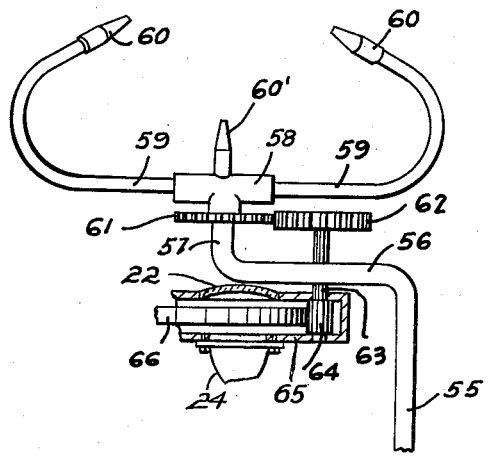
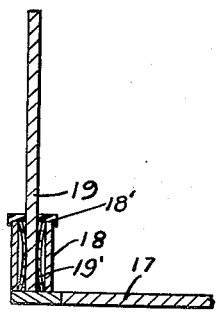
INVENTOR.
Walter Lee Giblet Patented Jan. 9, 1951

2,537,048

UNITED STATES PATENT OFFICE 2,537,048

COLOR WHEEL FOR SPRINKLERS

Walter Lee Giblet, Oklahoma City, Okla.

Application March 8, 1946, Serial No. 652,840

1 Claim. (Cl. 299—4)

This invention relates to a color wheel for sprinklers, and more particularly to such a device adapted to impart a colored effect to water emanating from a sprinkling device, as for example, a lawn sprinkler.

A primary object of the invention is the provision of a device for imparting an enhanced colored ornamental effect to water emanating from a sprinkler or the like.

An additional object of the invention is the provision of such a device which will impart a constantly changing variety of colors to such water.

A further object of the invention is the provision of such a device which may be readily moved from place to place, and which may be attached to any conventional lawn sprinkler with a minimum of effort and difficulty.

Still another object of the invention is the provision of such a device which is steady and durable in construction, reliable and efficient in operation, and relatively simple and inexpensive to assemble and install.

Other objects, partly obvious and partly pointed out as the description of the invention proceeds, and shown in the accompanying drawing wherein there are disclosed preferred embodiments of this inventive concept.

Similar reference characters refer to similar parts throughout the several views of the drawing.

In the drawing:

Figure 1 is a top plan view of one form of the device embodying features of the instant invention, certain parts thereof being indicated by dotted lines.

Figure 2 is a sectional view taken substantially along the line 2—2 of Figure 1 and viewed in the direction indicated by the arrows.

Figure 3 is a fragmentary view of a modified form of construction.

Figure 4 is a fragmentary sectional view of a still further modified form of construction, and Figure 5 is an enlarged sectional view taken substantially along the line 5—5 of Figure 2.

Similar reference characters refer to similar parts throughout the several views of the drawing.

Having reference now to the drawing, to Figures 1 and 2 more particularly, there is generally indicated at 10 a sprinkler, comprised of an upright 11 and a horizontally extending portion 12 adapted to be connected as at 13 to any suitable source of water. The sprinkler includes a rotatable T-head 14, from the arms of which extend arcuate sprinkler members 15 terminating in nozzles 16. A centrally positioned nozzle 16' may also be provided if desired, and the entire assembly, including the T 14 is rotated by the force of the water passing therethrough, in any desired conventional manner. From the upright portion 11 legs 17 extend outwardly, and terminate in sockets 18, which may be sealed against moisture as by a gasket or sealing cap 18', one of which is provided with spring clips 19', as best shown in Figure 5.

The sockets 18 in turn support upright members 19, connected by a transverse member 20, which members in turn support a housing 21 preferably of circular or disk-like configuration, and of opaque material. The housing 21 is provided at a point beneath one of the sprinkler arms 15 and adjacent thereto, with a transparent or translucent lens 22 it its upper surface, and in its lower surface with an aperture 23 in which is positioned a light socket 24 secured thereto in any desired manner as by engaging a suitably slotted boss on a flange 25 secured to the underside of housing 21. Socket 24 has a lamp, not shown, seated therein. The socket is connected to a source of suitable electric current, supplied as by a wire 26.

A suitable shaft 27 centrally positioned in the housing 21 has mounted thereon a disk 28 provided peripherally with an upstanding flange 29, which disk is preferably of transparent or translucent colored material, and which may be divided into a plurality of segments or quadrants of various colors as desired. In the embodiment shown in Figures 1 and 2 the edge of the housing is cut away as at 30, permitting the flange 29 to abut the base of the T 14, in such manner that rotation of the T is imparted by friction through the flange 29 to the disk 28.

It will thus be seen that as the sprinkler head is rotated in a known manner, the disk is correspondingly rotated, and a variety of various colored lights is obtained. When the bulb in the socket 24 is illuminated, the rays thereof pass through disc 28 and lens 22 and play in the water emanating from the nozzles 16 and 16'.

In Figure 3 a modified form of construction is disclosed, wherein the sprinkler upright 40 terminates in a T 41, from which extend branches 42, terminating in nozzles 43, a central nozzle 43' being provided if desired. The base of the T 41 is provided with a gear 45 adapted to mesh with a gear 46 carried by a shaft 47 in a housing 48 substantially identical to the housing 21. The housing 48 contains a color disk 49 having a toothed edge which is in turn adapted to engage a pinion 50 carried by the shaft 47. In this modification it will be readily apparent that the color lens 22 may be set at any position in the housing to play at any desired angular relation on the spray of water emanating from the nozzles 43 and 43'.

A still further modification is disclosed in Figure 4 wherein the upright 55 of the sprinkler device is provided with an offset portion 56 terminating in a second upright portion 57 which carries a T 58 from which branches 59 extend to nozzles 60. The T 58 carries a gear 61, which meshes with the gear 62 carried by a shaft 63, which shaft in turn carries a pinion 64 situated in a housing 65 of the type previously described. A color disk 66 having a toothed edge is adapted to engage with the pinion 64. In this modification it will be readily understood that if desired the lens 22 may be positioned directly under the center of the device, or under the central nozzle 60', and accordingly played vertically through the spray of water emitted from the nozzle.

From the foregoing it will now be seen that there is herein provided a device which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted as merely illustrative and not in a limiting sense.

I claim:

A color wheel for sprinklers comprising the combination with an upstanding tubular member having a rotatable nozzle member on the upper end thereof, of outwardly extending supporting members on said tubular member, spaced apart upwardly opening socket members on said supporting members, upright supporting members engaging in said socket members, a horizontal disc shaped housing on said latter members adjacent said tubular member, a varicolored translucent member rotatably supported in said housing, a light on one side of said housing adjacent a marginal edge of said translucent member and adjacent said tubular member, and means connecting said translucent member to said nozzle member for rotation therewith.

WALTER LEE GIBLET.

REFERENCES CITED

The following references are of record in the file of this patent:

UNITED STATES PATENTS

| Number | Name | Date |
| --- | --- | --- |
| 1,435,140 | Rolland | Nov. 7, 1922 |
| 1,535,508 | Todd et al. | Apr. 28, 1925 |
| 1,575,952 | Todd et al. | Mar. 9, 1926 |
| 1,728,456 | Stuewe | Sept. 17, 1929 |
| 1,802,082 | Kloppe | Apr. 21, 1931 |
| 1,818,319 | Good | Aug. 11, 1931 |